United States Patent Office 3,521,169
Patented July 21, 1970

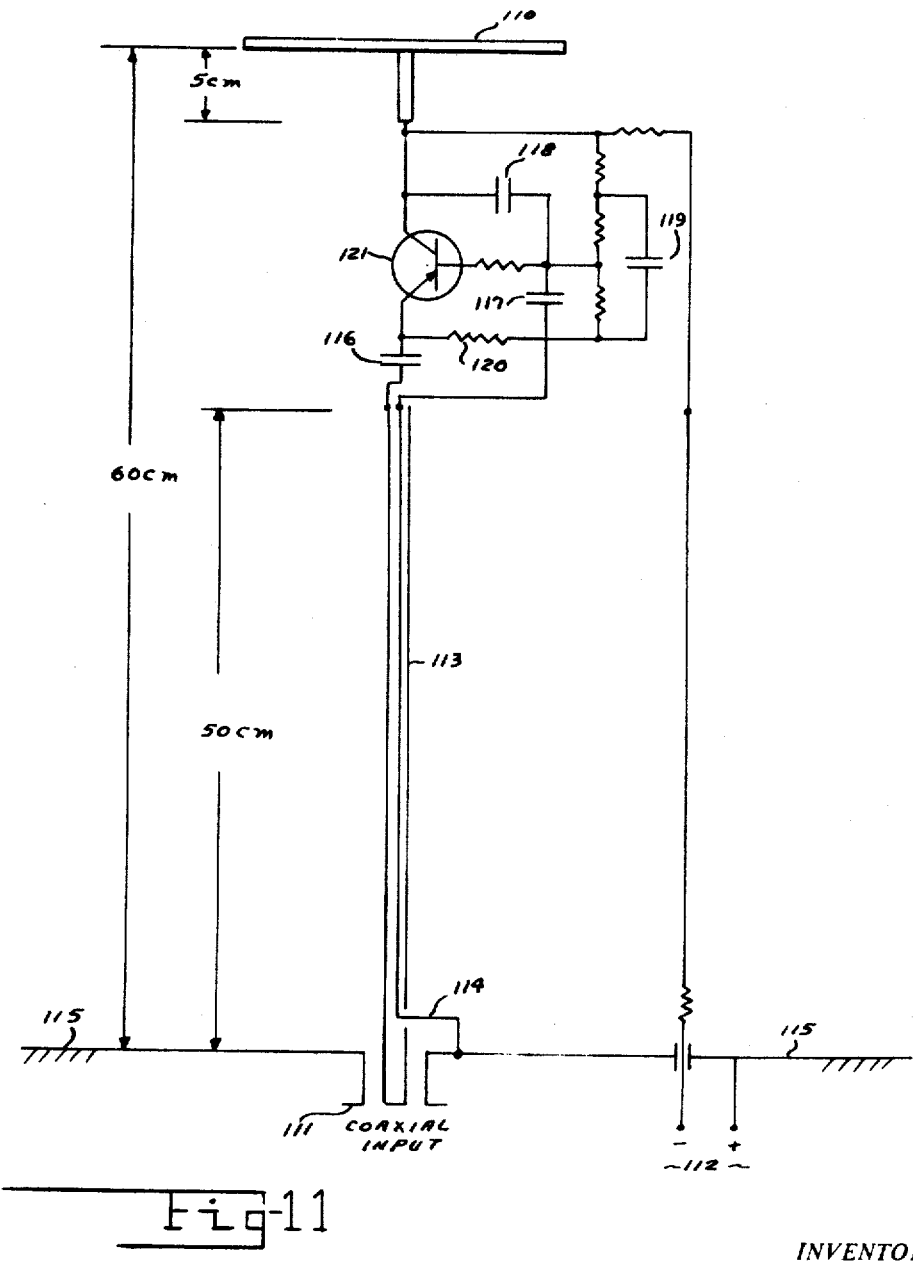

3,521,169
SUBMINIATURE INTEGRATED ANTENNA
Edwin M. Turner, 1530 Newton Ave., Dayton, Ohio 45406; Hans H. Meinke, Gockelberg 3, Gauting, Germany; and Heinz Lindenmeier, Ungererstr. 36, Munich, Germany
Filed July 17, 1967, Ser. No. 654,010
Int. Cl. H01q 1/26, 9/00
U.S. Cl. 325—105
6 Claims

ABSTRACT OF THE DISCLOSURE

An electrically small antenna (that is, an antenna whose dimensions are small compared to a wavelength) having a transistor active element integrated into the electrical geometry of the antenna such that the electrical characteristics at the connections to the integrated antenna have the electrical parameters of a physically much larger conventional antenna.

BACKGROUND OF THE INVENTION

This invention pertains to antennas particularly for the MF, HF, the VHF and the UHF bands, that are non-reciprocal and have an active element integrated into the physical and electrical geometry of the antenna.

The physical size of prior art antennas has been largely determined by the frequency at which the antenna was to effectively operate. Thus antennas have had rather narrow bandwidths, and effective tuning over wide frequency ranges has been difficult. Prior antennas have normally had physical dimensions of ¼ wavelength or multiples thereof, with antennas of less than ¼ being very inefficient. Generally, it is desirable that an antenna be physically as small as feasible and still provide a suitable output signal. This is true whether the antenna be a television receiving antenna mounted on a roof top or a transmitting antenna on an airplane or a battleship.

SUMMARY

The integrating of an active electrical element into the passive elements of an electrically small electromagnetic wave antenna provides a subminiature, integrated, active, antenna system that has a wide band frequency response, an output level equivalent to a physically much larger conventional antenna, a high radiation resistance, and a controllable matching impedance. The manner of integrating the active element into the passive array is dependent upon whether the antenna is to be used for transmission or receiving. Thus, a particular integrated antenna is not a reciprocal device that may be used for both transmitting and receiving without switching or circuit changes to the active element.

BRIEF DESCRIPTION OF THE DRAWING

FIG. 11 is a detailed diagram of a specific transmitting embodiment of the invention.

DESCRIPTION OF THE PREFERRED EMBODIMENTS

Figure 1:
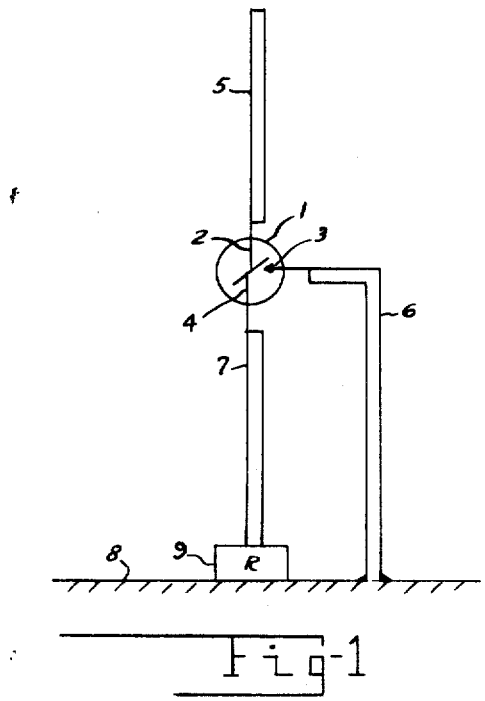
FIG. 1 is a symbolic-schematic representation of an embodiment of the invention used as a receiving antenna.

FIG. 1 illustrates a subminiature integrated antenna (SIA) for receiving electromagnetic wave radiation. A conventional transistor 1 having a base connection 2, an emitter connection 3 and a collector connection 4 is integrated within the wave interception cylindrical elements 5 connected to the base, 6 connected to the emitter, and 7 connected to the collector. The antenna operates electrically above the ground plane 8. In this illustrated embodiment the conventional receiver 9 takes its input from the signal voltage developed between the lower end of element 7 and the ground plane 8. Element 6 connected to the emitter is also signal terminated, in perpendicular relationship, at the ground plane 8. The received signal may also be extracted from the emitter circuit branch of the antenna (as shown in detailed FIG. 7) and the collector branch of the antenna effectively terminated at the ground plane.

Figure 2:
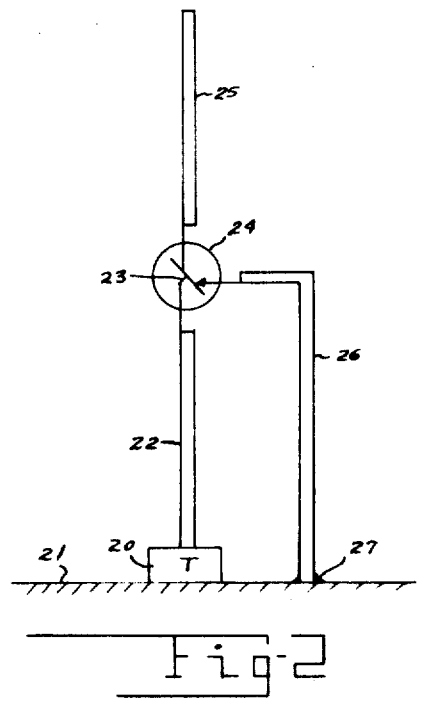
FIG. 2 is a symbolic-schematic representation of an embodiment of the invention used as a transmitting antenna.

FIG. 2 illustrates a transmitting embodiment of the invention. In this embodiment the transmitter 20 injects a signal between the ground plane 21, and the lower end of radiating element 22 which is connected to the base 23 of transistor 24. Radiating element 25 is connected to the collector of the transistor and the element 26 connected to the emitter of the transistor is terminated at signal ground potential in the ground plane at 27.

Figure 3:
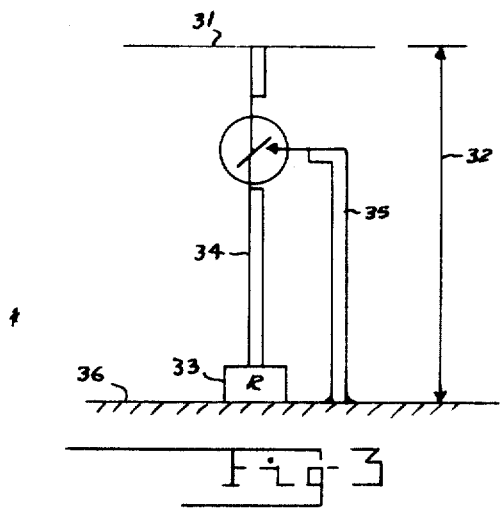
FIG. 3 is a symbolic-schematic representation of another embodiment of the invention used as a receiving antenna.
Figure 4:
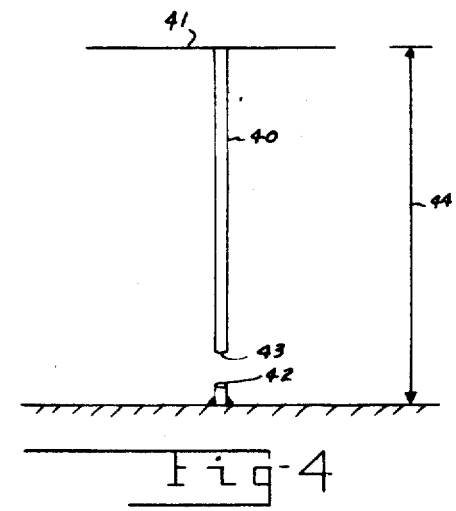
FIG. 4 is a symbolic-schematic of a conventional state-of-the-art antenna.

FIG. 3 shows a modification of the receiving antenna of FIG. 1 wherein the top element 5 of FIG. 1 has been replaced with a plate element 31. This plate or disc, parallel to the ground plane 36, provides a greater capacitance to the ground plane than the vertical rod element 5 and also results in a still more compact antenna. This type of element modification is somewhat analogous to the well-known capacitance "top-loading" of conventional antennas, as illustrated in FIG. 4. In FIG. 4 conventional vertical element 40 is top loaded with a conventional capacitance plate 41. The signal is extracted for reception, or injected for transmission, by connections at locations 42 and 43.

The embodiment of this invention, as illustrated in FIG. 3, will now be compared mathematically with the conventional antenna illustrated in FIG. 4. The effective heights of the antennas are considered the same, numerically, i.e., the distances 32 and 44 are equal, and the areas of the top plates 31 and 41 are the same and have the same physical capacitance with their respective ground planes.

In accord with the present invention the resonant frequency of the subminiaturized integrated antenna (SIA) is much lower than that of the conventional antenna having the same physical size. The conventional rod 40 loaded with a capacity plate 41 operated as a receiving antenna develops an E.M.F. at terminals 42 and 43 proportional to the product of the electric field intensity of the oncoming wave times the effective height of the antenna 44 (E.M.F.$=E \times h_{\text{eff.}}$). The impedance presented at the terminals 42 and 43 consists of the inductance, L, of the rod 40, the capacitance C of plate 41 (and to a negligible extent also that of the rod 40) and the radiation resistance $R_S$ of the coupling with the propagating wave.

The resonant frequency $f_r$ of this antenna, FIG. 4, may be calculated from the well-known formula:

$$f_r = \frac{1}{2\pi\sqrt{LC}}$$

or $$\omega_r = \frac{1}{\sqrt{LC}}$$

where $\omega = 2\pi f$.

Figure 5:
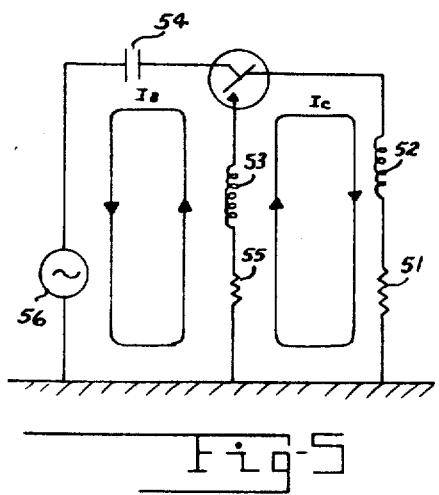
FIG. 5 is a schematic current-flow diagram of a receiving embodiment of the invention.

The operation of the SIA of FIG. 3 may most readily be understood by considering the equivalent schematic circuit diagram of FIG. 5, in which:

The input impedance $R_E$ of the receiver 33 is represented by resistance 51,

The inductance $L_a$ of rod 34 is represented by inductance 52,

The inductance L of rod 35 is represented by inductance 53,

The capacitance C of plate 31 is represented by the capacitance 54, and

The radiation resistance $R_S$ of the electric dipole by the resistance 55.

There are two branches of current flow as shown in FIG. 5. The (transistor) base current $I_B$ in the left-hand branch and the collector current $I_C$ in the right-hand branch. The left-hand branch also contains the voltage 56 from the wave field. This voltage potential, like in the passive antenna of FIG. 4, is proportional to $E \times h_{\text{eff}}$; the voltage intensity of the incoming wave E, times the effective height of the antenna. The equation for the left circuit is:

$$E \times h_{\text{eff}} = I_B \times \frac{1}{j\omega C} + (I_B + I_C)(j\omega L + R_s) + U_{BE}$$

where $U_{BE}$ is the voltage between the base and the emitter of the transistor. The transconductance S of the transistor is defined as $S = I_C/U_{BE}$ and the current amplification factor of the transistor B, is defined as $B = I_C/I_B$. Substituting these relationships in the previous equation results in:

$$E \times h_{\text{eff}} = I_C \left[ \frac{1}{j\omega CB} + (j\omega L + R_s)\left(1 + \frac{1}{B}\right) + \frac{1}{S} \right]$$

The collector current $I_C$ which flows through the receiver $R_E$ (neglecting the minor reaction of $R_E$ on the current $I_C$), derived from the previous expression, is:

$$I_C = \frac{E \times h_{\text{eff}}}{\frac{1}{j\omega CB} + (j\omega L + R_s)\left(1 + \frac{1}{B}\right) + \frac{1}{S}}$$

The resonant frequency $f_r$ is the frequency at which $I_C$ reaches a maximum for a given impressed voltage $E \times h_{\text{eff}}$, that is when the denominator of the previous expression becomes a minimum. This is the frequency at which the reactive component of the denominator becomes zero, thus for resonance, $\omega_r$ connoting $\omega$ at resonance:

$$\frac{1}{j\omega_r CB} + j\omega_r L\left(1 + \frac{1}{B}\right) = 0$$

or $$\omega_r = \frac{1}{\sqrt{L\left(1 + \frac{1}{B}\right)CB}} = \frac{1}{\sqrt{LC}} \times \frac{1}{\sqrt{B+1}}$$

The resonant frequency of the passive antenna of FIG. 4 is proportional to $1/\sqrt{LC}$ as previously set forth. The resonant frequency of the SIA of FIG. 3, as shown above, is proportional to $$\frac{1}{\sqrt{LC}} \times \frac{1}{\sqrt{B+1}}$$

thus the resonant frequency of the SIA may be considered that of the passive antenna decreased by the factor $$\frac{1}{\sqrt{B+1}}$$

or one over the square root of the sum of the current gain of the transistor plus one. For example, if a transistor having a current amplification factor of forty-eight is used, the resonant frequency of a SIA having the same physical dimensions as a conventional passive antenna, will be approximately one-seventh that of the passive antenna. In the comparison of an operating embodiment of a SIA and a passive antenna both having a height of 50 cm. and a top capacity of 12 pf. the resonant frequency of the passive antenna was approximately 58 mHz. and of the SIA 12 mHz. (The current gain of the transistor was approximately 24). Thus the maximum dimensions of this SIA is approximately $\frac{1}{50}$ of the wavelength of its resonant frequency.

The current gain of transistors may readily be changed by changing the direct current operating potentials (bias) on the transistor, thus the resonant frequency of a SIA may readily be changed, steadily or suddenly.

The frequency dependency of an antenna is greatly lessened by the integration of the active element into the antenna, that is, the bandwidth is increased. In a short conventional passive antenna the radiation resistance is quite low resulting in a quite narrow bandwidth. The present invention greatly overcomes this limitation. In the previously referred to passive antenna having a height of 50 cm. and a top capacitance of 12 pf. the 3 db bandwidth was 2 mHz., this is 3.5% of the center frequency of 58 mHz. In the physically equivalent previously referred to SIA the 3 db points are 7.5 mHz. and 21 mHz. This represents a frequency range of one to two point eight. The ratio of the resistive component of an antenna to its reactive component determines the bandwidth. For the passive antennna of FIG. 4 at its resonance ($\omega_r$) this ratio is expressed by:

$$\frac{R_s}{1/\omega_r C}, \text{ which equals } R_s \sqrt{\frac{C}{L}}$$

In the SIA with the parameters as previously delineated this ratio is expressed by:

$$\frac{R_s\left(1+\frac{1}{B}\right)+\frac{1}{S}}{\frac{1}{\omega_r CB} + \omega_r L\left(1+\frac{1}{B}\right)} = \left[R_s\left(1+\frac{1}{B}\right)+\frac{1}{S}\right]\left[\frac{\sqrt{C}}{\sqrt{L}} \times \frac{B}{\sqrt{B+1}}\right]$$

The quantity $$\left(1+\frac{1}{B}\right)$$

is a quantity only slightly larger than one and may be disregarded. In the SIA the quantity $1/S$ and the factor $$\frac{B}{\sqrt{B+1}}$$

thus increase the quotient $$R_s \frac{\sqrt{C}}{\sqrt{L}}$$

representing the bandwidth of a physically equivalent passive antenna. A representative numerical value for $1/S$ is 12 and for $$\frac{B}{\sqrt{B+1}}$$

is 7. By utilizing transistors having different characteristics, or by changing the external voltages on a specific transistor, the bandwidth may be readily changed and controlled.

The transistor in the SIA also changes the characteristic impedance of the antenna to a higher value than that of the physically equivalent passive antenna. The output impedance of the SIA more nearly matches that of conventional coaxial cables than does the conventional passive antenna, and by changing the direct current voltages and currents affecting the transistor, the antenna output impedance value may be changed to a desired value. Typical representative values of output impedances are, for the SIA of FIG. 3 (and detailed in FIG. 7), sixty ohms, and for the passive antenna of FIG. 4 six ohms.

Figure 6:
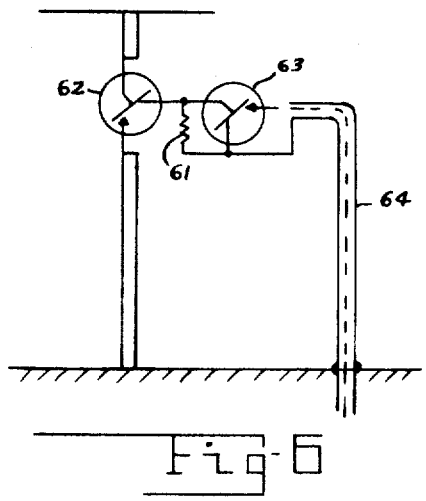
FIG. 6 is a symbolic-schematic representation of an embodiment of the invention used as a receiving antenna and having an active element comprising two transistors.

More than one transistor, or active element, may be used in the SIA. FIG. 6 symbolically represents an SIA having two transistors. The fundamental operation of the antenna is unchanged from an antenna utilizing but one transistor. Greater signal output may be obtained from this combination, and better decoupling between the input and the output. In addition, by the use of more than one transistor greater flexibility is obtained in varying the gain and transconductance of the active element. This provides greater electrical control of the bandwidth and frequency response characteristics of the SIA.

Figure 7:
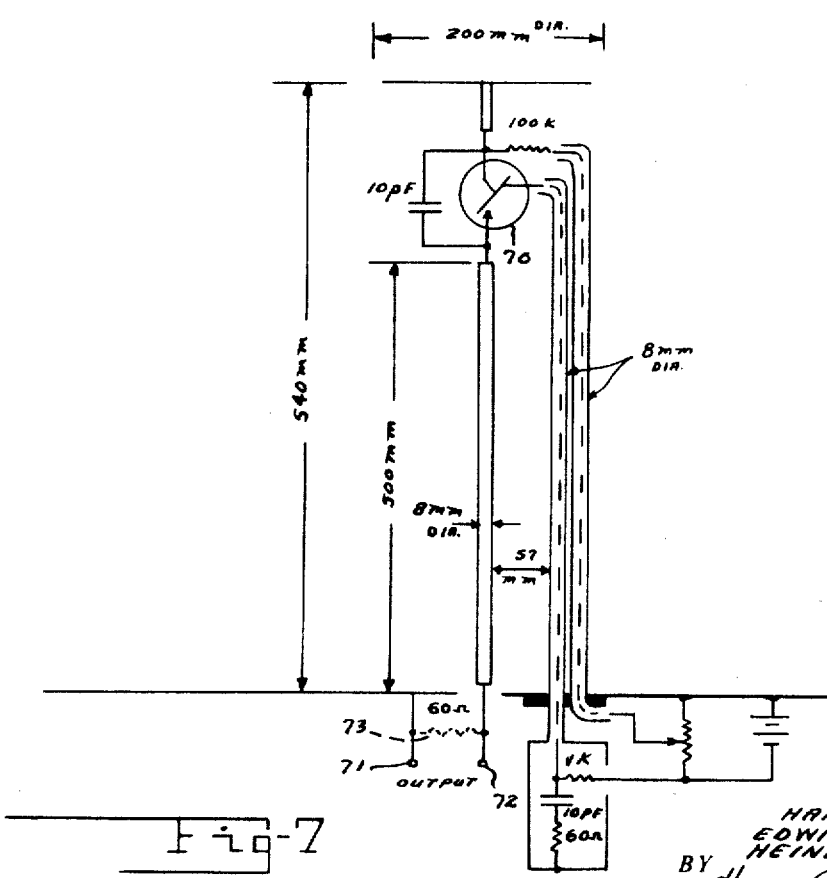
FIG. 7 is a detailed diagram of a specific receiving embodiment of the invention.
Figure 8:
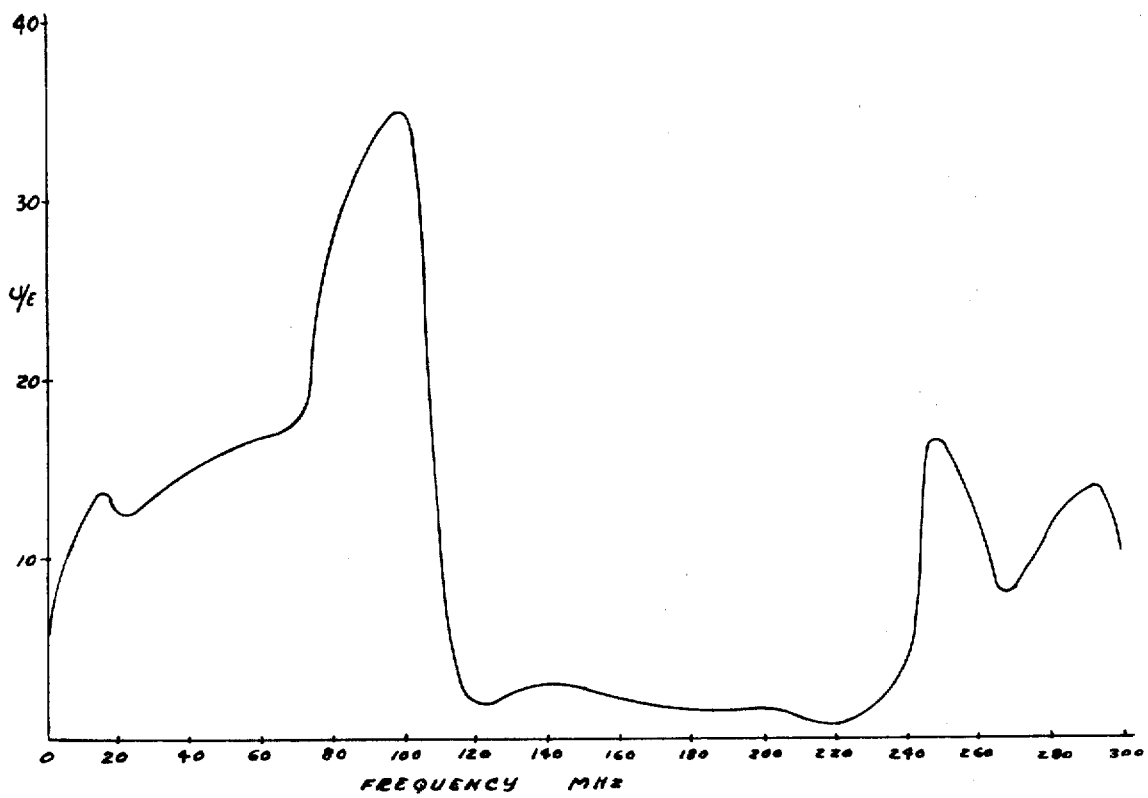
FIG. 8 is a frequency response characteristic curve of the specific embodiment detailed in FIG. 7.

FIG. 7 is a detailed schematic diagram of an operating, receiving, embodiment of this invention. In this embodiment a single transistor 70 is the active element integrated into the antenna. Output signals are extracted from this embodiment at terminals 71 and 72. The output impedance is 60 ohms, thus this SIA may feed directly into a 60 ohm coaxial line. If it is desired to take the output at a high impedance this SIA should be terminated with a 60 ohm resistor 73. The frequency response characteristic of this specific embodiment is plotted in FIG. 8. The ordinate values of this plot are the measured values of output voltage U for a given electric field strength E of the received wave. The bandwidth of this embodiment may readily be considered to be from approximately 10 mHz. to approximately 110 mHz.

Figure 9:
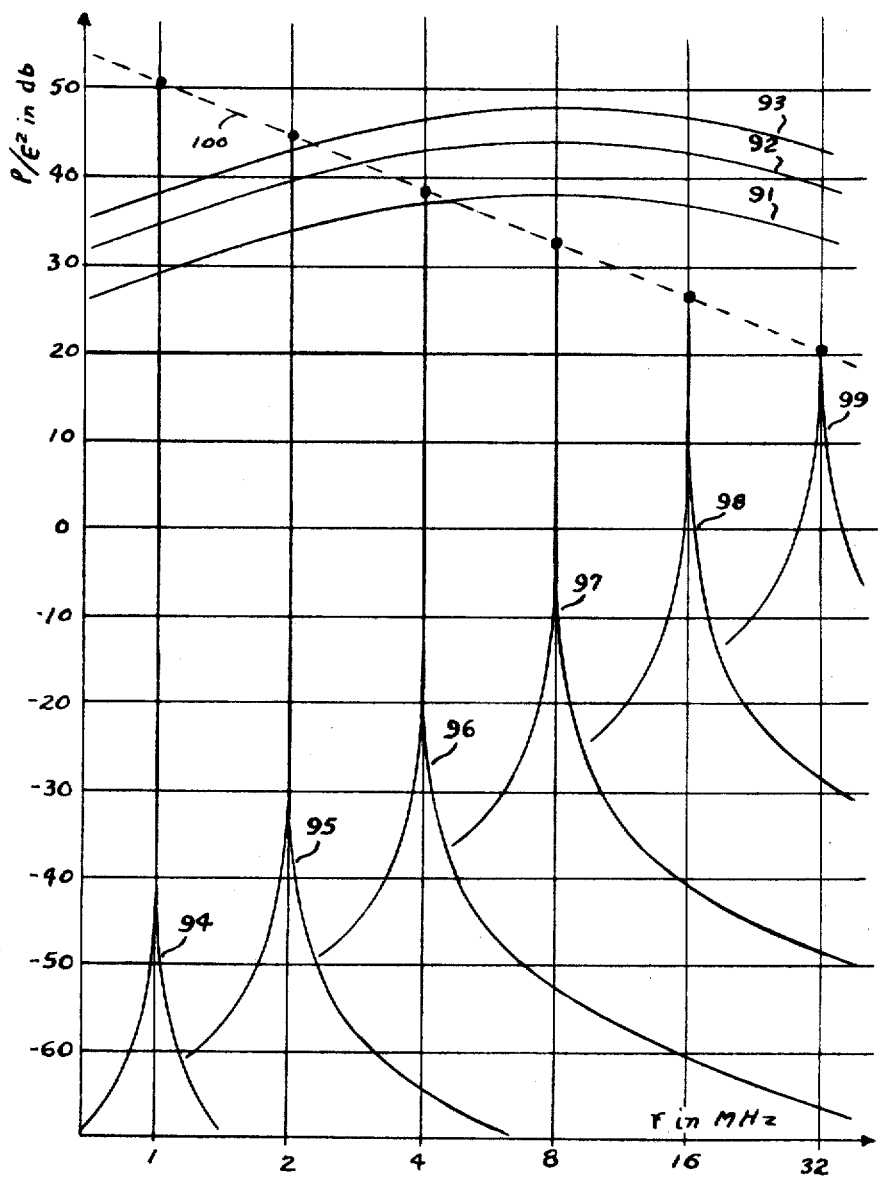
FIG. 9 is a plot comparing a conventional antenna with an embodiment of the invention.

In embodiments using a single transistor as the active element connected as in FIG. 3 the optimum gain realizable from the transistor is reduced by the capacitance between the base circuit and the collector circuit. This effect may be reduced considerably by using a coaxial element in place of the single rod 34, in which the outer conductor of the coaxial output line covers the collector rod. However, this may not provide the optimum load for best transistor gain because generally the characteristic impedance of the coaxial element may be too low in value for optimum matching purposes. The embodiment using two transistors shown in FIG. 6 overcomes these difficulties as the value of resistor 61 may be made the proper load value for the collector of the first transistor 62. The second transistor 63 operating with a grounded collector is used for matching to the characteristic impedance of the coaxial output line 64. Curves 91, 92 and 93 of FIG. 9 show measured received power P for given electric field strength E over a broad frequency range with values of resistance 61 of 0.5K, 1.0K, and 1.5K ohms, respectively. The plotted curves 91, 92 and 93 of FIG. 9, are of an embodiment of an SIA as shown in FIG. 6 that has a height of 50 cm. and a top capacity of 10 pf. FIG. 9 also shows a comparison of the output power P of both this embodiment of an SIA (curves 91, 92 and 93) and of a conventional passive antenna of the same physical dimensions, curves 94 through 99, for the same given electric field strength E. The conventional antenna measured is as shown in FIG. 4 with the inclusion of an additional inductance and load resistance inserted at the terminals 42 and 43. The inductance was used to resonate the antenna at the plotted frequencies and the series load resonance was made equal to the radiation resistance at that frequency. The curves 94 through 99 show the characteristics of the various resonant frequencies of the passive antenna for different values of inductance tuning the antenna to the indicated frequencies. The dotted line 100 connects the peak-power values for the maximum responses of the passive antenna with different values of inductance in a theoretically lossless passive antenna. The practical maximum power output at the resonant frequencies depend considerably on the losses in the radiator (antenna) and on the losses in the tuning inductance. Values of load resistance greater than the radiation resistance will result in lower maximum powers and greater bandwidths.

Figure 10:
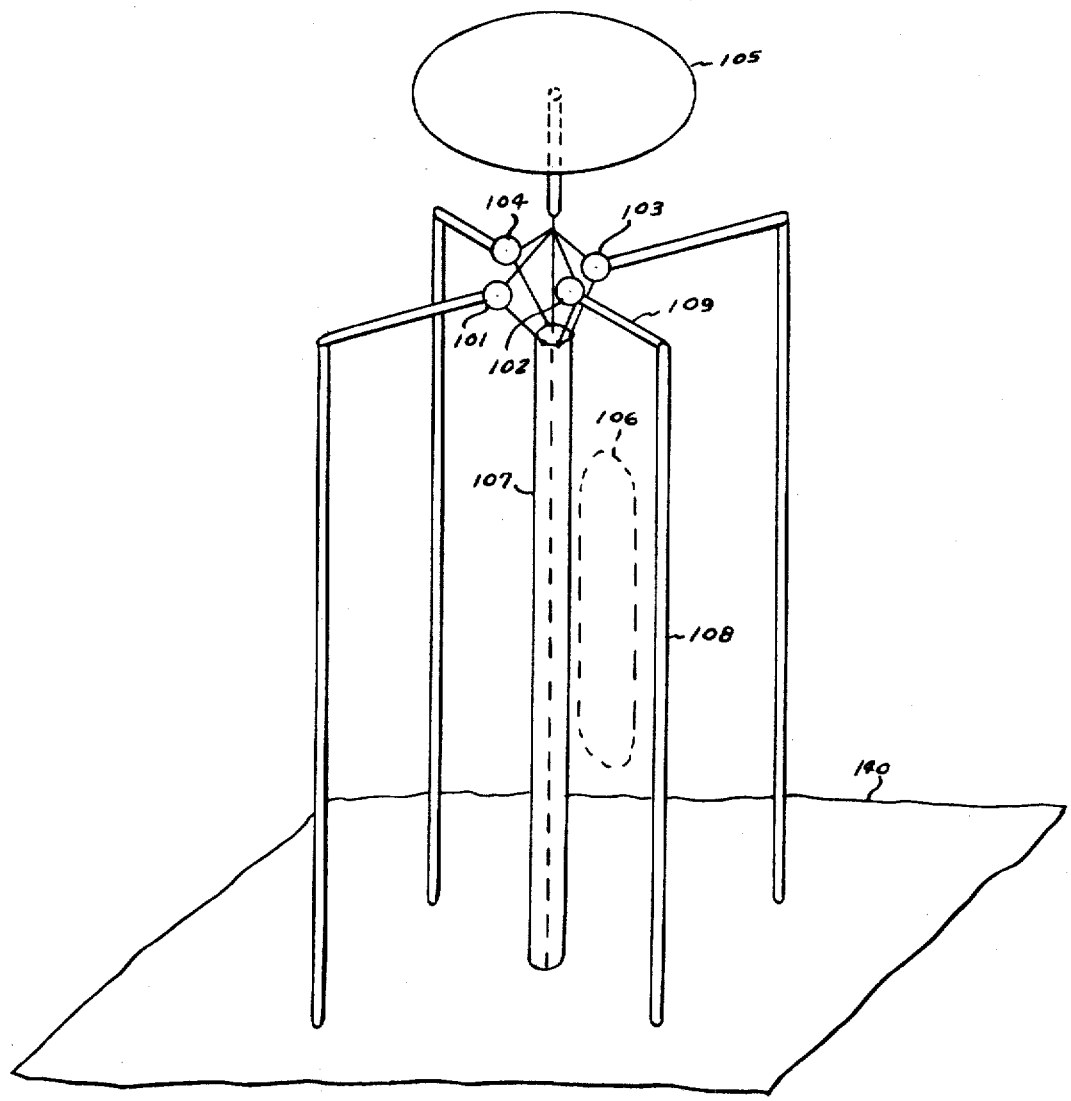
FIG. 10 is a symbolic representation of a directional array.

Various degrees of horizontal directivity may be obtained using an SIA system as shown symbolically in FIG. 10. By changing the direct current electrical potentials and currents flowing through transistors 101, 102, 103 and 104 the transconductances of the transistors may be made unequal and a directivity pattern established. The degree of directivity is thus controlled electrically. In addition to controlling the shape of the pattern the directivity pattern may also be directed or rotated at will, by changing the electric potentials on the transistors. As in previous embodiments, reception of the electric field of the oncoming wave is through the top capacity 105 and the reception of the magnetic field of the wave is through the waves coupling with the various individual magnetic loops of each transistor. Loop 106 of transistor 102, having vertical elements 107 and 108, horizontal elements 109 and the ground plane 140, is one of the four magnetic loops of this embodiment.

A detailed embodiment of a transmitting SIA is shown in FIG. 11. The top capacity plate 110 has a capacitance of 10 pf. It is also a radiating element of the SIA. The signal to be radiated is injected into the SIA from a conventional coaxial line at the coaxial coupler 111. A direct current potential from an energy source is supplied at connections 112. Radiating element 113, which is an extension of the center conductor of the coaxial input, is a hollow tube containing the insulated conductor 114. The outer conductor of the coaxial input is connected to the ground plane 115. Capacitors 116 and 117 are coupling capacitors and capacitors 118 and 119 are for radio frequency stabilization. Resistor 120 is a direct current voltage stabilizing resistor. The remaining resistors provide the bias and operating potentials for the transistor 121. This transmitting SIA has a resonance frequency of 10 mHz. A passive radiator having the same physical dimensions has a resonant frequency of 90 mHz. This transmitting embodiment (FIG. 11) starts to exhibit negative impedance characteristics at frequencies above 70 mHz. and tends to go into self-excitation at higher frequencies. For operation extending into those higher frequencies additional suppression and neutralizing circuits should be added to the circuitry.

While the complete and exact theory of operation of the SIA is not as yet fully developed, it has been found that energy is extracted from (or radiated into) both the electric field and the magnetic field of an electromagnetic wave. (As, for example, in the embodiments illustrated in FIGS. 1 and 11, the upper rod conducting element 2 and the plate conducting element 110 communicate with the electric field of the propagating wave, and the loop formed by cylindrical conductive elements 6 and 7 of FIG. 1 and the hollow cylindrical conducting element 113 of FIG. 11 communicate with the magnetic field of the propagating wave.) The integrated active element which is electrically and physically positioned between the electric and magnetic communicating elements, through its current gain characteristics combines these energies and presents a current flow in the element of the SIA to which external connection is made that has the characteristics of an antenna having a much larger physical size. It is to be noted that output from (or input to) the SIA is not through the integrated active element as would be the case in merely adding an amplifier to an electrically small antenna, but that the signal connection to a SIA is at the end of a radiating (or receiving) element.

What is claimed is:

1. A subminiature integrated antenna operating above a ground plane for receiving electromagnetic wave energy, having a maximum physical dimension less than 1/50 of a wavelength of its resonant frequency comprising:
(a) capacitance plate means parallel to the said ground plane for receiving the electric field of the electromagnetic wave and providing a voltage potential;
(b) cylindrical means perpendicular to the said ground plane for intercepting the magnetic field of the electromagnetic wave;
(c) transistor means having current gain, responsive to the said voltage potential and cooperating with the said cylindrical means for providing a current flow in the said cylindrical means, and being physically and electrically positioned between the said cylindrical means and the said capacitance plate means; and
(d) electrical connecting means cooperating with the said cylindrical means and the ground plane for providing an electrical output.

2. A subminiature integrated antenna operating above a ground plane, for radiating an electromagnetic wave, having a maximum physical dimension less than 1/50 of a wavelength of its resonant frequency comprising:
(a) capacitance plate means parallel to the said ground plane for radiating the electric field of the electromagnetic wave;
(b) cylindrical means perpendicular to the said ground for radiating the magnetic field of the electromagnetic wave;
(c) transistor means having current gain, cooperating with the said cylindrical means and the said capacitance plate means, physically and electrically positioned between the said cylindrical means and the said capacitance plate means for providing an electric potential to the said capacitance plate means and a current flow in the said cylindrical means; and
(d) signal injecting means cooperating with the said cylindrical means and the said ground plane for injecting a signal to be radiated to the antenna.

3. A subminiature integrated antenna having a resonant frequency and operating electrically above a ground plane for receiving an electromagnetic wave signal comprising:
(a) a transistor having a base, an emitter and a collector for providing a current gain;
(b) capacitance plate means in parallel spaced apart relationship to the said ground plane connected to the transistor base, for receiving the electric field of the said electromagnetic wave and providing an electric potential to the said transistor base;
(c) cylindrical means cooperating with the said emitter and collector of the transistor and the said ground plane providing a magnetic loop for receiving the magnetic field of the electromagnetic wave;
(d) signal output means cooperating with the said magnetic loop and the said ground plane for providing an electrical output signal responsive to the said electromagnetic wave signal.

4. The subminiature integrated antenna as claimed in claim 3 wherein the ratio of said spaced apart relationship of the capacitance plate from the said ground plane to the wavelength of the said resonant frequency is less than 1 to 40.

5. A subminiature integrated antenna having a resonant frequency operating above a ground plane for receiving an electromagnetic wave comprising:
(a) capacitance plate means parallel to the said ground plane having a capacitance C for receiving the electric field of the said electromagnetic wave and providing a voltage potential;
(b) cylindrical element means perpendicular to the said capacitance plate means and the said ground plane positioned therebetween, having an inductance L for receiving the magnetic field of the said electromagnetic wave and providing a current flow to the said ground plane;
(c) transistor active element means having a base element, an emitter element, and a collector element and a current gain factor B, the said base element cooperating with the said voltage potential of the capacitance plate and the said emitter and collector element cooperating with the said cylindrical element means whereby the said current flow in the said cylindrical element is increased responsive to the said voltage potential and the resonant frequency, $f_r$ of the antenna is expressed approximately by the expression $$f_r = \frac{1}{2\pi\sqrt{LC}} \times \frac{1}{\sqrt{1+B}}$$

6. The improvement in an antenna having a ground plane, a cylindrical element perpendicular to the said ground plane, a top plate capacitance, and signal connection means essentially between the cylindrical element and the ground plane, and having a resonant frequency, the improvement for lowering the said resonant frequency comprising:
(a) active element means having current gain positioned electrically and physically between the said top plate and the cylindrical element cooperating with the said top plate and the cylindrical element wherein the resonant frequency of the antenna is lowered by approximately the factor of one over the square root of the sum of one plus the said current gain; and
(b) electrical means for supplying energy to the said active element means.

References Cited

UNITED STATES PATENTS 3,343,089   9/1967   Murphy et al. _____ 343—701
3,386,033   5/1968   Copeland et al. _____ 343—701

ELI LIEBERMAN, Primary Examiner

U.S. Cl. X.R.

325—375; 343—701, 752